United States Patent [19]
Tsai et al.

[11] Patent Number: 5,825,292
[45] Date of Patent: *Oct. 20, 1998

[54] ELECTRONIC ARTICLE SURVEILLANCE MARKERS FOR DIRECT APPLICATION TO OPTICALLY RECORDED MEDIA

[75] Inventors: Ching-Long Tsai, Woodbury; Norman L. Koning, Hastings; John G. Fitzgerald, Woodbury; Chester Piotrowski, White Bear Lake, all of Minn.; Rita M. Lunderville, Menomonie, Wis.

[73] Assignee: Minnesota Mining and Manufacturing Company, St. Paul, Minn.

[ * ] Notice: The term of this patent shall not extend beyond the expiration date of Pat. No. 5,699,047.

[21] Appl. No.: 887,862

[22] Filed: Jul. 3, 1997

Related U.S. Application Data

[63] Continuation of Ser. No. 587,721, Jan. 19, 1996, Pat. No. 5,699,047.

[51] Int. Cl.⁶ .................................................. G08B 13/187
[52] U.S. Cl. ........................... 340/572; 340/551; 369/273
[58] Field of Search ................................. 340/551, 572; 369/273

[56] References Cited

U.S. PATENT DOCUMENTS

| | | | |
|---|---|---|---|
| 3,765,007 | 10/1973 | Elder | 340/280 |
| 4,709,813 | 12/1987 | Wildt | 206/312 |
| 4,746,908 | 5/1988 | Montean | 340/551 |
| 4,825,197 | 4/1989 | Church et al. | 340/572 |
| 4,829,288 | 5/1989 | Eisenbeis | 340/551 |
| 4,967,185 | 10/1990 | Montean | 340/572 |
| 5,347,508 | 9/1994 | Montbriand et al. | 369/273 |
| 5,580,664 | 12/1996 | Tsai | 428/457 |
| 5,699,047 | 12/1997 | Tsai et al. | 340/551 |

FOREIGN PATENT DOCUMENTS 0 604 293 A1  12/1993  European Pat. Off. .

OTHER PUBLICATIONS

3M Library Security Systems Brochure, "3M Tattle–Tape™ Detection Strip for Non–print Media", 1992.
3M Brochure, "3M Tattle–Tape™ Security Strips for Non–print Media".
KNOGO North America Inc. Brochure, "Electro Thred Strips".

*Primary Examiner*—Glen Swann
*Attorney, Agent, or Firm*—Peter L. Olson; Kari H. Bartingale

[57] ABSTRACT

An Electronic Article Surveillance (EAS) marker is adapted for direct application to optically recorded media such as compact disks, CD-ROM's, laser disks, digital video disks, and the like. The marker includes a support sheet and one or more marker elements which are positioned such that the mass distribution of the marker is symmetrically disposed about the center of the marker. This ensures that when the marker is properly positioned on the optically recorded media, the marker does not adversely affect the mechanical balance of the media.

49 Claims, 3 Drawing Sheets

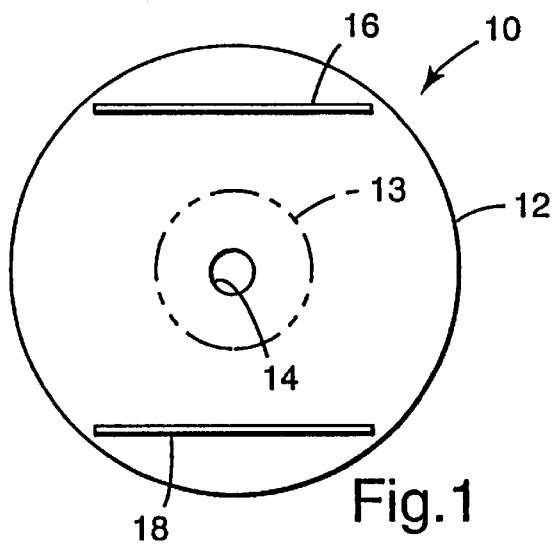
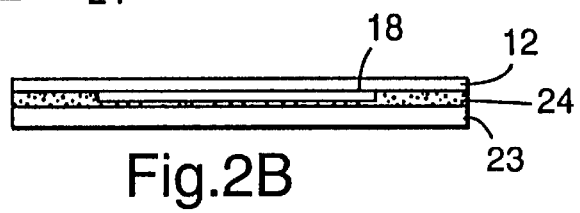
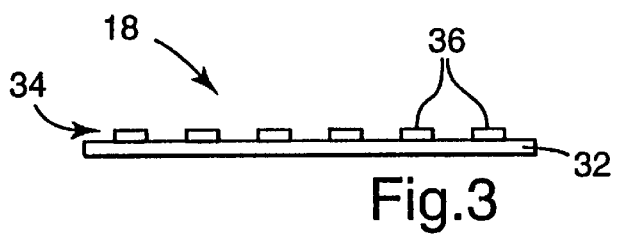
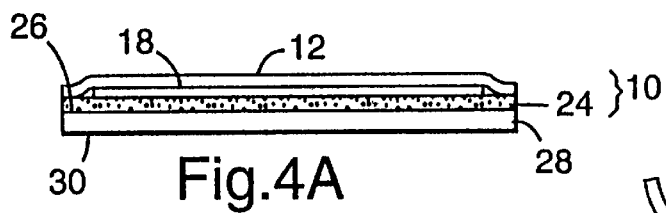
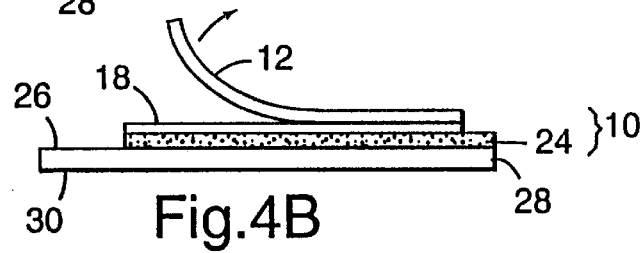

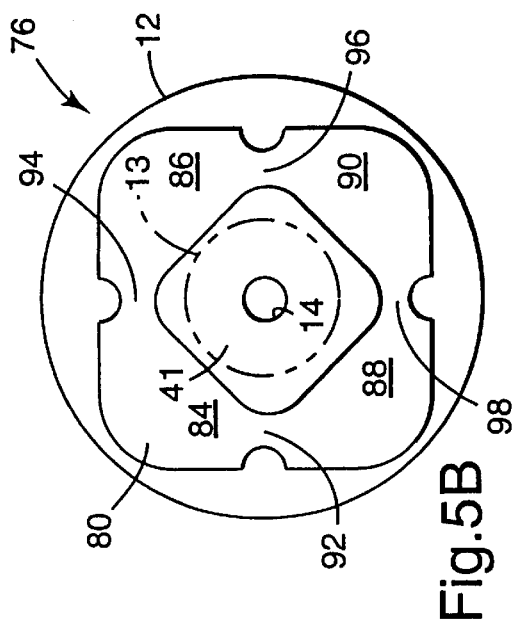
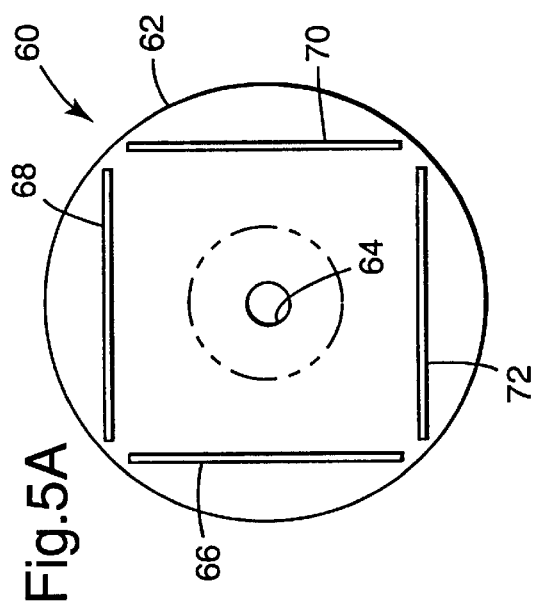
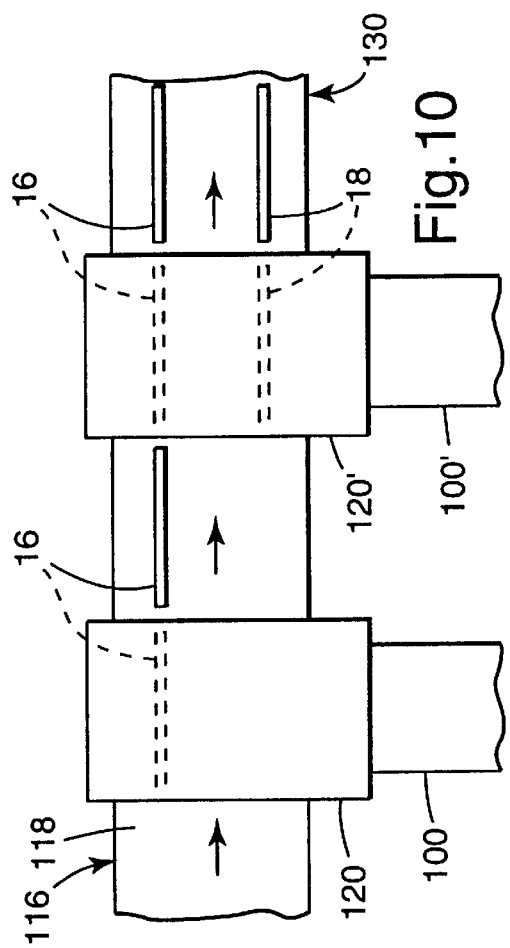
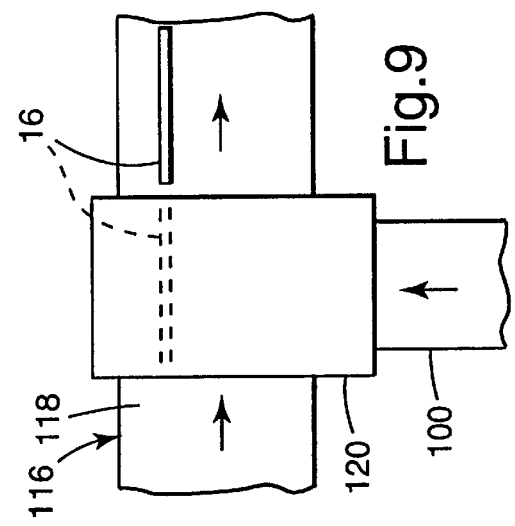

ELECTRONIC ARTICLE SURVEILLANCE MARKERS FOR DIRECT APPLICATION TO OPTICALLY RECORDED MEDIA

This is a continuation of application Ser. No. 08/587,721 filed Jan. 19, 1996, now U.S. Pat. No. 5,699,047.

FIELD OF THE INVENTION

The invention relates to specialized markers which are useful in magnetic-type electronic article surveillance (EAS) systems, which can be directly applied to the surface of optically recorded media without having adverse effects on the operation or durability of the media. Markers of the invention include single-status markers and reversibly reactivatable dual-status markers, both of which are useful in magnetic-type electronic article surveillance (EAS) systems.

BACKGROUND

Magnetic-type EAS systems are widely used to inhibit the theft of merchandise such as clothing, books, cassettes and compact disks. Electronic article surveillance (EAS) systems are often used to prevent unauthorized removal of articles from a protected area, such as a library or retail store. An EAS system usually includes an interrogation zone or corridor located near the exit of the protected area and markers or tags attached to the articles to be protected. EAS systems have been based on magnetic, RF, microwave and magneto-restrictive technologies. Regardless of the particular technology involved, the EAS systems are designed such that the tag will produce some characteristic response when exposed to an interrogating signal in the corridor. Detection of this characteristic response indicates the presence of a sensitized tag in the corridor. The EAS system then initiates some appropriate security action, such as sounding an audible alarm, locking an exit gate, etc. To allow authorized removal of articles from the protected area, tags that are either permanently or reversibly deactivatable (i.e., dual status tags) are often used.

Although EAS markers have been in common use for the theft protection of optically recorded media such as compact disks and CD-ROM's, the markers have generally been adapted for attachment to the packages containing new compact disks and have been poorly suited for direct attachment to the compact disk itself For libraries and other institutions that repeatedly check compact disks in and out to accommodate the needs of customers and clients, effective inventory control would prefer that EAS markers are attached to the compact disk.

Some markers for direct attachment to compact disks have been developed. One, available as "DCD-1" from Minnesota Mining and Manufacturing Company, St. Paul, Minn., is a single marker strip and security overlay which are attached to a compact disk. However, this marker adversely effects the mechanical balance of the disk, which can adversely affect the operation of modern high rotation speed CD-ROM drives, CD players, and other optically recorded media playback equipment which require that the media be mechanically balanced for proper operation. Another product, "CD-Guard", available from Knogo North America, Inc., Hauppauge, Long Island, N.Y., suffers the same mechanical balance drawback. An optical information storage disk comprising an embedded, generally annular, dual-status EAS marker is described in coassigned U.S. Pat. No. 5,347,508.

There is therefore a need in the art for a marker specifically designed for protection of optically recorded media.

SUMMARY

The invention is an Electronic Article Surveillance (EAS) marker adapted for direct application to optically recorded media such as compact disks, CD-ROM's, laser disks, digital video disks, and the like. The marker includes a support sheet and one or more marker elements which are positioned such that the mass distribution of the marker is symmetrically disposed about the center of the marker. This ensures that when the marker is properly positioned on the optically recorded media, the marker does not adversely affect the mechanical balance of the media.

BRIEF DESCRIPTION OF THE DRAWINGS

The various objects, features and advantages of the present invention will be better understood upon reading and understanding the following Detailed Description and accompanying drawings, in which:

FIG. 1 shows one embodiment of a marker according to the present invention;

FIGS. 2A and 2B show a side views of the marker of the type shown in FIG. 1;

FIG. 3 shows a simplified side view of a dual status marker element;

FIGS. 4A and 4B show side views of two embodiments of the marker of the present invention attached to a compact disk;

FIGS. 5A and 5B show a top views of alternate bi-directionally responsive dual status markers;

FIGS. 7, 8, 9 and 10 show processes for producing markers of the present invention.

DETAILED DESCRIPTION

Figure 6A:
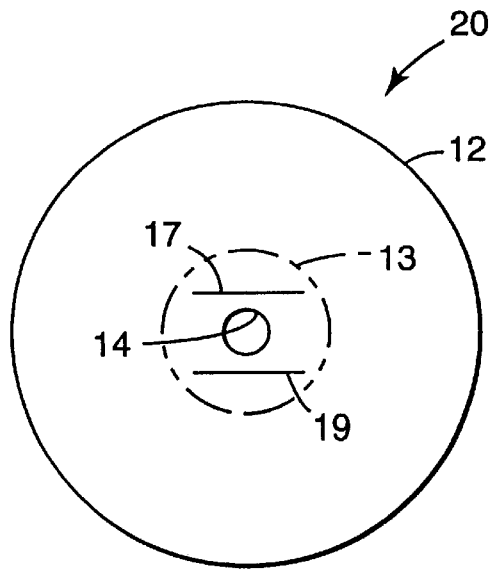
FIGS. 6A and 6B show top views of an alternate markers, designed to constrain the marker elements to the nonrecorded region of a compact disk.

In the following detailed description, reference is made to the accompanying drawings which form a part hereof, and in which is shown by way of illustration a specific embodiment in which the invention may be practiced. It is to be understood that other embodiments may be utilized and structural changes made without departing from the spirit and scope of the present invention.

The invention is an Electronic Article Surveillance (EAS) marker adapted for direct application to optically recorded media such as compact disks, CD-ROM's, laser disks, digital video disks, and the like. For simplicity of illustration, the following Detailed Description and will often refer to the specific case of compact disks; however, those of skill in the art will readily recognize that the markers described herein are applicable to any optically recorded media.

The EAS marker for this application is easy to apply to an exposed surface of the optically recorded media, provides good detection performance, does not interfere with the physical operation of the media or of the equipment for reading the media, and does not cause short or long term damage to the media. Specifically, the adhesive on the marker must be chemically non-reactive with any materials used in the media, and the marker installation must not adversely affect the mechanical balance of the media. Also, the marker should preferably be compatible with the performance characteristics of the detection and the activation/deactivation equipment in common EAS System use.

A first embodiment of an Electronic Article Surveillance (EAS) marker 10 for optically recorded media is shown in top view in FIG. 1 and in side view in FIG. 2. The marker includes a circular support sheet 12 having a centered, concentric circular hole 14, and two marker elements 16 and 18 positioned such that the mass distribution of the marker 10 is symmetrically disposed about the center of the marker 10. This ensures that when the marker 10 is properly placed on a compact disk, the marker does not adversely effect the mechanical balance of the disk. The mechanical balance of the disk is very important for proper operation of high speed CD-ROM drives, CD players and other optically recorded media playback equipment. The marker 10 also includes an adhesive layer 24 (FIG. 2A) which is used to attach the marker to a compact disk.

The hole 14 of the support sheet 12 acts as an alignment mechanism and serves to assist the user in properly positioning the marker onto the compact disk or other optically recorded media. The hole 14 is centered on the support sheet 12 and is of a size and shape to substantially correspond to the hole in a typical CD, CD-ROM, laser disk, or other optically recorded media. Markers are preferably adapted for different media by providing markers with different sized support sheets and centered holes which correspond to the physical size of the media at issue. To attach the marker 10 to a compact disk, the user simply orients the hole 14 with the hole of the media. When the two holes are aligned, the marker can be attached to the media. By properly positioning the marker onto the media, the mechanical balance of the marker ensures that presence of the marker on the media will not adversely effect the performance of the media or of any media playback equipment, such as CD players or CD-ROM drives.

In an alternate embodiment, shown in FIG. 2B, a marker 11 also includes a release liner 23 on top of adhesive layer 24. The release liner protects the adhesive layer 24 from damage and from accidental attachment to other surfaces. To attach the marker 11 to a compact disk, the release liner is removed, exposing the adhesive layer 24, which is then used to attach the marker to the compact disk.

The marker elements 16 and 18 can be dual status or single status. If the marker elements 16 and 18 are single status, the marker elements 16 and 18 would consist of a signal producing layer of low coercive force, high permeability magnetic material. For a dual status marker, one of several possible alternative embodiments is shown in FIG. 3. FIG. 3 shows a side view of a dual status marker element of the type described in coassigned U.S. Pat. No. 3,765,007, which is incorporated herein by reference. The dual status marker 18 includes a signal-producing layer 32 of low coercive force, high permeability magnetic material, and a signal-blocking layer 34 which includes a plurality of segments 36 of remanently magnetizable magnetic material. In alternative embodiments, signal-blocking layer 34 may be a contiguous layer of remanently magnetizable magnetic material.

Referring again to FIG. 1, marker elements 16 and 18 are preferably in parallel alignment and symmetrically disposed on opposite sides of hole 14. In one preferred embodiment, marker elements 16 and 18 are further preferably positioned with their inner edges separated by a distance greater than 4 cm, and the dimensions of marker elements 18 and 20 are further preferably selected such that their maximum radial extent, from the center of the hole 14 is less than about 5.9 cm.

FIG. 4A shows a side view of a marker 10 attached to a surface of a compact disk 28. Support sheet 12, marker element 18 and the adhesive layer 24 are attached to a first side 26 of the compact disk 28 with the adhesive layer 24. Preferably, the first side 26 is the nonrecorded or "label" side of the compact disk 28, while the second side 30 of the compact disk 28 is the optically detectable recorded surface 30. In this embodiment, support sheet 12 is preferably designed to remain attached to the compact disk 28, and functions to protect the marker elements 16 and 18 from damage and from tampering.

In an alternate embodiment, shown in FIG. 4B, the support sheet 12 is designed so that it is releasable. In this embodiment, the adhesive 24 with which the marker elements are attached to the compact disk should be more aggressive than the adhesive (not shown) with which the marker elements are attached to the support sheet. In this way, once the marker elements are attached to the compact disk 28, the support sheet 12 is removed, leaving the marker elements 16 and 18 attached to the surface of the compact disk. This embodiment may be preferred for certain applications where the additional weight of the support sheet, if left attached to the compact disk, would be undesirable.

For compact disk applications such as that shown in FIG. 4A, support sheet 12 is preferably transparent and colorless, permitting information printed on the surface 26 of compact disk 28 to be easily read while providing protection for the marker elements and the label. For selected compact disk applications, it may be preferred for at least portions of support sheet 12 to contain white pigment and/or to have a printable surface so the support sheet can function as a label.

In addition to the embodiments shown in FIGS. 2A–B and 4A–B where the marker is a stack of elements comprising the support sheet 12, marker elements 16 and 18 and adhesive layer 24, it shall be understood that other embodiments in which the order of the elements are changed are also within the scope of the invention. For example, the order of elements could be support sheet 12, adhesive layer 24 with marker elements 16 and 18 on top of the adhesive layer 24, without departing from the scope of the present invention.

Adhesive materials suitable for use as adhesive layer 24 preferably have chemically inert characteristics in terms of interactions with any of the materials used in the construction of the optically recorded media or its label. In other words, the adhesive 24 is preferably nonreactive with any of the materials used in the construction of the media or its label. Additionally, no materials used in adhesive layer 24 can bleed or migrate out of the layer such that they come in contact with the drive mechanisms or other internal parts of the playback equipment, storage containers, etc., or corrode the reflective coating on the media, etc. One preferred adhesive is available from Minnesota Mining and Manufacturing Company, St. Paul, Minn. as No. 9461P Transfer Adhesive.

In one exemplary embodiment of the marker 10 support sheet 12 is a circular segment of transparent polyethylene terephthalate film having a thickness of 50 microns (2 mils) and a diameter of 11.4 cm (4.5 in.). The center hole 14 has a diameter of 1.7 cm (0.67 in.). Marker element 18 is about 7.7 cm (3 in.) long and 1 mm (40 mils) wide. The signal producing layer 32, which is coextensive with marker element 18, is about 18 micrometers (0.7 mils) thick and made from an amorphous magnetic alloy consisting of about 67% (atomic percent) Co, 5% Fe, and 25% B and Si, which is commercially available from AlliedSignal Corp. of Parsippany, N.J., as Product No. 2705 M. The signal-blocking layer 34 includes a plurality of spaced segments, each approximately 5 mm long, 40 micrometers thick, and the same width as the signal-producing layer, made from an FeCr alloy which is commercially available from Arnold Engineering of Marengo, Ill. as Arnokrome 3. In the preferred embodiment, the samples of Arnokrome 3 used in the example marker were subjected to an annealing process to achieve a uniform coercivity of about 200±30 Oersteds. Also in the preferred embodiment, the samples of Product No. 2705M were annealed to reduce the coercivity and enhance anisotropy in the cross-web direction. Although specific materials are described herein, it shall be understood by those of skill in the art that different materials and different marker constructions could be used without departing from the scope of the present invention.

In one embodiment, marker elements 16 and 18 are preferably substantially identical in dimensions, material specifications, and in the characteristic signals they produce when interrogated in an active state by an EAS system. In an alternate embodiment, the marker elements are dissimilar in dimensions, material specifications, or both to produce a combined characteristic signal which is detectably different from the characteristic signals of individual marker elements, ambient noise signal sources, etc.

An alternative form of dual-status Electronic Article Surveillance (EAS) marker 60 of the invention is shown in FIG. 5A. Marker 60 is similar to that described in commonly assigned U.S. Pat. No. 4,829,288, which is incorporated herein by reference. Marker 60 comprises a circular support sheet 62 having a centered, concentric circular hole 64 and further comprises four long narrow rectangular marker elements 66, 68, 70, and 72. The marker elements 66, 68, 70, and 72 are preferably symmetrically disposed about the center of hole 64, and in one preferred embodiment, the inner edges of elements 66, 68, 70, and 72 form a square. In one specific embodiment, the elements 66, 68, 70, and 72 are located such that their closest distance of separation from the center of the marker is preferably at least 1.9 cm. The length and width dimensions of marker elements 66, 68, 70, and 72 are selected such that their maximum radial extent, from the center of the hole 64 is preferably less than about 5.9 cm. The discrete marker elements 66, 68, 70, and 72, act as orthogonal switching elements, enabling the marker 60 to have a "bi-directional" response. Although marker elements 66, 68, 70, and 72 are illustrated in FIG. 5A in an embodiment where the ends of the elements are physically separated from each other, those of skill in the art will readily recognize that other embodiments where the adjacent ends of marker elements are in mutual contact are also within the scope of the present invention. Also, EAS markers having an odd number of marker elements in non-orthogonal arrangements such as an EAS marker (not shown) having marker elements in an equilateral triangular arrangement are also well within the scope of the present invention. Again, an important feature is that the mass of the marker is symmetrically disposed about the center of the marker, thus ensuring that the mechanical balance of a compact disk is maintained after the marker is attached.

Another alternative form of "bi-directionally responsive" dual-status marker is shown in FIG. 5B. Marker 76 is similar to those described in U.S. Pat. Nos. 4,746,908, 4,825,197 and 4,967,185, which are incorporated herein by reference. Marker 76 comprises a circular support sheet 12, and a single marker element 80 comprising a contiguous signal producing layer extending around the center hole 14 of support sheet 12. Marker 76 has corner areas 84, 86, 88 and 90 which act as flux collectors to concentrate the magnetic flux from the interrogation field through the interconnecting members 92, 94, 96 and 98, which serve as the detectable switching elements.

The above described embodiments are useful for those compact disks that are recordable or recorded on only one surface. For compact disks or laser disks that are recordable on both surfaces, or for those applications where it may be desirable to mark the recorded side of a single sided compact disk, a marker such as those shown in FIGS. 6A and 6B may be preferred. The marker of FIG. 6A includes two marker elements 17 and 19 on a support sheet 12, having a centered, concentric circular hole 14. The marker 40 of FIG. 6B includes a single marker element 41 of the type shown in FIG. 5B. A ring shown as phantom line 13 in both FIGS. 6A and 6B corresponds to the nonrecorded or "hub" region of the optically recorded. This nonrecorded region 13 is the portion of the compact disk where a CD-ROM drive or CD player clamps onto the compact disk. For most compact disks, the nonrecorded region has a radius of about 1.9 cm, although it shall be understood that for this embodiment, the marker elements need only be within the hub region of the optically recorded media, regardless of its particular dimension.

Figure 6B:
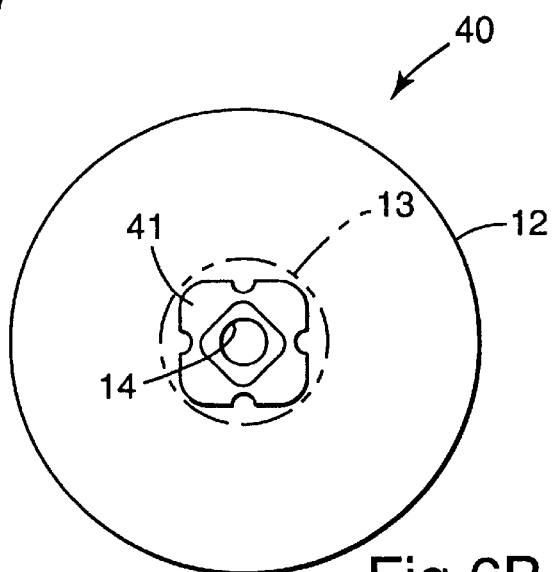
Figure 7:
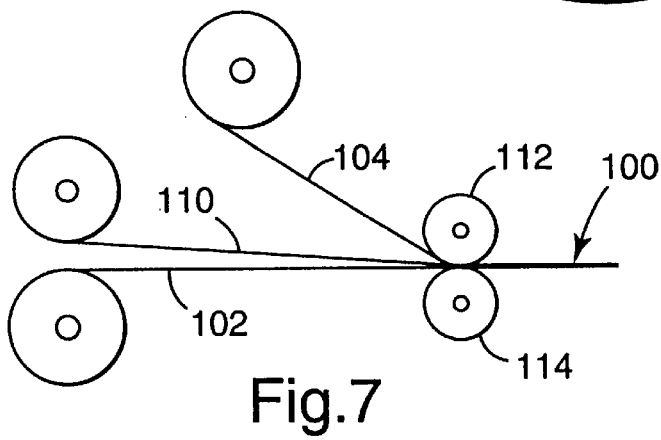

In the embodiments shown in FIGS. 6A and 6B, the marker elements 17, 19, and 41, respectively, are positioned on the markers 20 and 40, respectively, such that the marker elements are attached to the nonrecorded region of the compact disk. By restraining the marker elements to the nonrecorded region of the compact disk, the marker elements cannot interfere with the disk reading mechanism of a CD-ROM drive or CD player. In addition, the marker elements are again carefully positioned to maintain the mechanical balance of a compact disk to which they are properly attached.

Figure 8:
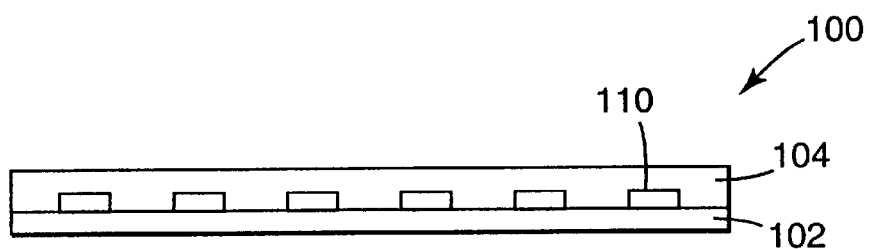

A process for producing dual-status markers 10 of the type shown in FIG. 1 is shown in FIGS. 7–10. A continuous web of EAS marker construction 100, shown in an end view in FIG. 8, is first produced by bringing the strips of remanently magnetizable foil 110 into properly aligned contact with the strip of high permeability magnetic foil 102 and laminating an adhesive coated side of tape 104 to the exposed surfaces of foil 102 and foil 110 by transporting them in contact under pressure between nip rollers 112 and 114.

FIG. 9 shows the next stage of the process, in which a marker construction 100 is brought into a shearing station 120 which shears off a narrow strip to form a marker element 16 with its long dimension equal to the width of marker construction 100, and releasably adheres marker element 16 to a low-tack adhesive side 118 of a temporary carrier strip 116. In one preferred embodiment, the adhesive side 118 of the carrier strip 116 is coated with a pressure sensitive adhesive on adhesive side 118. An exemplary carrier strip is No. 295 Tape, available from Minnesota Mining and Manufacturing Company, St. Paul, Minn. However, other suitable pressure sensitive adhesive carrier strips could also be used.

In station 120, guideways and positioning means transport the substantially continuous strip of marker construction 100 in a direction which is orthogonal to the direction in which the carrier strip 116 is transported so that marker elements 16 thus formed are inherently aligned with their long dimension along the long dimension of the carrier strip 116. The guideways and positioning means for the two orthogonal strips are located such that the marker elements will be adhered in an off-center location when applied to carrier strip 116. A series of off-center marker elements 16 is sequentially applied along the length of carrier strip 116 by incrementally advancing the position of carrier strip 116 after each marker element 16 is sheared and applied to its low-tack surface.

In a first embodiment, the other marker elements 18 are applied to the low-tack adhesive surface 118 of carrier strip 116 on the off-center locations opposite from marker elements 16 by rotating the carrier strip 180° after marker elements 16 are applied, and re-transporting carrier strip 116 through shearing station 120. In processes where carrier strip 116 is rewound onto its supply reel after markers 116 are applied, carrier strip 116 must be transported through shearing station 120 in the opposite direction to enable proper off-center positioning of markers elements 18. In an alternative process variation, carrier strip 116 with marker elements 16 attached to adhesive surface 118 is temporarily retained on the take-up reel, and the take-up reel is removed and installed in the position of the original supply reel. Carrier strip 116 is then transported through shearing station 120 in the same direction used for the installation of marker elements 16 to accomplish off-center positioning and attachment of markers elements 18. In either process, the longitudinal positioning of carrier strip 116 must be controlled such that marker elements 16 will be in the same longitudinal position as marker elements 18. This ensures that the proper positioning of the marker elements on the marker is maintained to ensure proper mechanical balance of a compact disk when the marker is properly attached thereto.

In another alternative process variation, shown in FIG. 10, carrier strip 116 is sequentially transported through shearing station 120, which applies marker element 16, and a second shearing station 120', which applies marker element 18 in the opposite off-center position. The spacing between shearing stations 120 and 120' is designed such that marker elements 16 and 18 are aligned to achieve a properly balanced marker. FIG. 10 shows marker construction 100, from which marker elements 16 are sheared, moving into shearing station 120, and marker construction 100', from which marker elements 18 are sheared, moving into shearing station 120'. Marker constructions 100 and 100' may optionally be identical, or they may differ in such a way that marker element 18 has different signal-producing characteristics from marker element 16.

The product formed by any of the aforementioned process variations, comprising carrier strip 116 with marker elements 16 and 18 applied to its low-tack adhesive surface 118, is an EAS marker transfer sheet 130. The transfer sheet 130 can be used to transfer the marker elements to any other adhesive surface. For example, the transfer sheet 130 could be used to transfer marker elements to the high-tack adhesive surface of a support sheet such as circular support sheet 12, shown in FIGS. 1 and 2. EAS marker transfer sheets 130 of the invention are also useful to transfer marker elements to adhesive surfaces of other objects, product labels or packaging. For these other uses, different marker configurations and/or dimensions other than the specific marker embodiments shown herein could be used, as they may not have the mechanical balance requirements of a compact disk.

In another embodiment, with the addition of an adhesive layer 24 on the marker side of the carrier strip 116, the carrier strip 116 of transfer sheet 130 could function as the support sheet 12 of any of the markers shown in FIGS. 1, 5A–B or 6A–B, in the case where the support sheet 12 is releasable as shown in FIG. 4B.

In a variation of the above described processes of FIGS. 7–10, the marker elements of any of the above described marker embodiments could be directly attached to a support sheet 12, instead of to a temporary carrier sheet 116.

In an alternative EAS marker transfer sheet embodiment of the invention, not shown, a layer of high-tack adhesive and a removable carrier sheet are laminated or otherwise applied to the side of EAS marker construction 100, opposite from the side that will be adhered to surface 118 of carrier strip 116, before construction 100 enters shearing station 120. Similarly, a layer of high-tack adhesive and a removable carrier sheet would be laminated or otherwise applied to the side of EAS marker construction 100' before it entered shearing station 120', if two shearing stations were used. After removal of the removable carrier layer from each marker element, the resulting transfer sheet 130 is suitable for direct application of a dual-status Electronic Article Surveillance (EAS) marker of the invention to the label surface of a compact disk, or to some other item. For application of multiple marker elements to items other than compact disks, different configurations and/or dimensions may be required or preferred.

Although specific embodiments have been shown and described herein for purposes of illustration of exemplary embodiments, it will be understood by those of ordinary skill that a wide variety of alternate and/or equivalent implementations designed to achieve the same purposes may be substituted for the specific embodiments shown and described without departing from the scope of the present invention. Those of ordinary skill will readily appreciate that the present invention could be implemented in a wide variety of embodiments. This application is intended to cover any adaptations or variations of the preferred embodiments discussed herein. Therefore, it is intended that this invention be defined by the claims and the equivalents thereof.

We claim:

1. An Electronic Article Surveillance (EAS) marker for optically recorded media, the marker comprising:

at least one marker element comprising a signal-producing layer;

a support sheet adapted to support the marker elements in fixed positions such that the marker has a mass distribution that is symmetrically disposed about the center of the marker; and adhesive for attaching the marker to the optically recorded media, wherein the adhesive is chemically non-reactive with the optically recorded media;

wherein when the marker is properly attached to the optically recorded media, the mechanical balance of the optically recorded media is not adversely affected.

2. The marker of claim 1, wherein the signal producing layer is comprised of a low coercive force, high permeability magnetic material.

3. The marker of claim 1, wherein each marker element further includes a signal-blocking layer.

4. The marker of claim 3, wherein the signal-blocking layer of each marker element is segmented.

5. The marker of claim 4, wherein the signal-blocking layer of each marker element is contiguous.

6. The marker of claim 5, wherein the signal-blocking layer of each marker element is coextensive with the signal-producing layer.

7. The marker of claim 1, wherein the marker elements include two elongated marker elements, with parallel axes of elongation.

8. The marker of claim 7, wherein the two marker elements have substantially identical signal-producing characteristics.

9. The marker of claim 1, wherein the two marker elements have different signal-producing characteristics, and wherein the two different signal-producing characteristics combine to produce a characteristic signal that is different than the signal from either of the individual marker elements.

10. The marker of claim 1, further including a release liner covering the adhesive.

11. The marker of claim 1, wherein the support sheet is a circular support sheet having a circular center hole.

12. The marker of claim 11, wherein the circular support sheet has an outer diameter no greater than 11.4 cm and the circular center hole has a diameter of at least 1.7 cm.

13. The marker of claim 1, wherein each marker element is maintained in a fixed position within an annular region bounded by concentric circles of inner radius 1.9 cm and outer radius 5.9 cm.

14. The marker of claim 1, wherein each marker element is maintained in a fixed position within a nonrecorded region of the media.

15. The marker of claim 1, wherein the support sheet is releasably attached to the marker elements such that after the marker is attached to the optically recorded media, the support sheet can be removed to leave the marker elements adhered at fixed positions on the optically recorded media.

16. The marker of claim 1, wherein the support sheet comprises a transfer sheet adapted to transfer the marker elements to a surface.

17. The marker of claim 16, wherein the surface is the adhesive surface.

18. The marker of claim 1, further including alignment means for properly positioning the marker onto the optically recorded media.

19. The marker of claim 1, wherein the optically recorded media is a compact disk, CD-ROM, laser disk or digital video disk.

20. A compact disk construction, comprising:
   a compact disk; and
   the marker of claim 1 properly attached thereto.

21. An Electronic Article Surveillance (EAS) marker for optically recorded media, the marker comprising:
   at least one marker element comprising a signal-producing layer;
   a support sheet adapted to support the marker elements in fixed positions such that the marker has a mass distribution that is symmetrically disposed about the center of the marker; and
   adhesive for attaching the marker to the optically recorded media, wherein the adhesive is chemically non-reactive with the optically recorded media;
   wherein when the marker is properly attached to the optically recorded media, the mechanical balance of the optically recorded media is not adversely affected and wherein the at least one marker element is a single marker element continuously extending around the center of the marker.

22. An Electronic Article Surveillance (EAS) marker adapted for attaching to optically recorded media, the marker comprising:
   only one marker element continuously extending around the center of the marker, wherein the marker element comprises a signal-producing layer; and
   a support sheet adapted to support the marker elements in fixed positions such that the marker has a mass distribution that is symmetrically disposed about the center of the marker;
   wherein when the marker is properly attached to the optically recorded media, the mechanical balance of the optically recorded media is not adversely affected.

23. The marker of claim 22, wherein the signal producing layer is comprised of a low coercive force, high permeability magnetic material.

24. The marker of claim 22, further including an adhesive for attaching the marker to the optically recorded media.

25. The marker of claim 24, wherein the adhesive is chemically non-reactive with the optically recorded media.

26. The marker of claim 25, further including a release liner covering the adhesive.

27. The marker of claim 22, wherein the support sheet is a circular support sheet having a circular center hole adapted for alignment with a circular center hole in the optically recorded media.

28. The marker of claim 22, wherein the support sheet is releasably attached to the marker element such that after the marker is attached to the optically recorded media, the support sheet can be removed to leave the marker elements adhered at fixed positions on the optically recorded media.

29. The marker of claim 22, wherein the support sheet comprises a transfer sheet adapted to transfer the marker element to a surface.

30. The marker of claim 29, wherein the surface is an adhesive surface.

31. The marker of claim 22, further including alignment means adapted to properly attach the marker onto the optically recorded media.

32. The marker of claim 22, wherein the optically recorded media is a compact disk, CD-ROM, laser disk or digital video disk.

33. An Electronic Article Surveillance (EAS) marker adapted for optically recorded media, the marker comprising:
   at least two marker elements, at least one of which comprises a signal-producing layer, and arranged in mutually non-orthogonal positions;
   a support sheet adapted to support the marker elements in fixed positions such that the marker has a mass distribution that is symmetrically disposed about the center of the marker; and adhesive for attaching the marker to the optically recorded media;
   wherein when the marker is properly attached to the optically recorded media, the mechanical balance of the optically recorded media is not adversely affected.

34. The marker of claim 33, wherein the signal producing layer is comprised of a low coercive force, high permeability magnetic material.

35. The marker of claim 33, wherein each marker element further includes a signal-blocking layer.

36. The marker of claim 35, wherein the signal-blocking layer of each marker element is segmented.

37. The marker of claim 36, wherein the signal-blocking layer of each marker element is contiguous.

38. The marker of claim 37, wherein the signal-blocking layer of each marker element is coextensive with the signal-producing layer.

39. The marker of claim 38, further including an adhesive for attaching the marker to the optically recorded media.

40. The marker of claim 39, wherein the adhesive is chemically non-reactive with the optically recorded media.

41. The marker of claim 40, further including a release liner covering the adhesive.

42. The marker of claim 33, further including alignment means adapted for properly positioning the marker onto the optically recorded media.

43. The marker of claim 33, wherein the optically recorded media is a compact disk, CD-ROM, laser disk or digital video disk.

44. A compact disk construction, comprising:

a compact disk; and the marker of claim 33 properly attached thereto.

45. An Electronic Article Surveillance (EAS) marker adapted for optically recorded media, the marker comprising:

at least two marker elements with parallel axes of elongation each comprising a signal-producing layer, wherein the marker elements have different signal-producing characteristics that combine to produce a characteristic signal that is different than the signal from either of the individual marker elements; and a support sheet adapted to support the marker elements in fixed positions such that the marker has a mass distribution that is symmetrically disposed about the center of the marker;

wherein when the marker is properly attached to the optically recorded media, the mechanical balance of the optically recorded media is not adversely affected.

46. A method of providing an Electronic Article Surveillance (EAS) marker for application to a surface of optically recorded media, comprising the steps of:

a) providing a support sheet;

b) providing one or more marker elements each comprising a signal-producing layer; and c) attaching the marker elements to the support sheet such that the marker elements has a mass distribution that is symmetrically disposed about the center of the support sheet.

47. The method according to claim 46, further including the steps of:

d) aligning the marker onto the optically recording media; and e) attaching the marker to the optically recorded media, wherein the mechanical balance of the optically recorded media is not adversely affected.

48. A method of providing an Electronic Article Surveillance (EAS) marker for application to a surface of optically recorded media, comprising the steps of:

a) providing a carrier strip including a low-tack adhesive surface;

b) providing one or more marker elements at least one of which comprises a signal-producing layer;

c) applying the marker elements to the carrier strip such that the marker elements has a mass distribution that is symmetrically disposed about the center of the carrier strip;

d) providing a support sheet including an adhesive surface; and e) transferring the marker elements from the carrier strip to the support sheet such that the marker elements have a mass distribution that is symmetrically disposed about the center of the support sheet.

49. The method according to claim 48, further including the steps of:

f) aligning the marker with the optically recording media; and g) attaching the marker to the optically recorded media, wherein the mechanical balance of the optically recorded media is not adversely affected.

* * * * *